(12) United States Patent
Wechsler et al.

(10) Patent No.: US 11,338,686 B2
(45) Date of Patent: May 24, 2022

(54) INDUCTIVE POWER TRANSFER PAD (71) Applicant: Bombardier Primove GmbH, Berlin (DE)

(72) Inventors: Simon Wechsler, Esslingen (DE); Roman Gunt, Heidelberg (DE)

(73) Assignee: Bombardier Primove GmbH, Berlin (DE)

( * ) Notice: Subject to any disclaimer, the term of this patent is extended or adjusted under 35 U.S.C. 154(b) by 48 days.

(21) Appl. No.: 16/641,029

(22) PCT Filed: Aug. 16, 2018

(86) PCT No.: PCT/EP2018/072242
§ 371 (c)(1),
(2) Date: Feb. 21, 2020

(87) PCT Pub. No.: WO2019/038183
PCT Pub. Date: Feb. 28, 2019

(65) Prior Publication Data
US 2020/0276906 A1 Sep. 3, 2020

(30) Foreign Application Priority Data

Aug. 25, 2017 (GB) ..................... 1713676

(51) Int. Cl.
*H02J 7/00* (2006.01)
*B60L 53/12* (2019.01)
*H02J 50/10* (2016.01)

(52) U.S. Cl.
CPC ............ *B60L 53/12* (2019.02); *H02J 7/0042* (2013.01); *H02J 50/10* (2016.02); *B60Y 2200/91* (2013.01)

(58) Field of Classification Search
CPC .......... H02J 50/10; H02J 7/0042; B60L 53/12
(Continued)

(56) References Cited

U.S. PATENT DOCUMENTS 10,274,532 B1 * 4/2019 Smith ..................... B60R 16/03
10,412,863 B2   9/2019 Elias et al.
(Continued)

FOREIGN PATENT DOCUMENTS

GB    2541728 A    3/2017
JP    201285472 A  4/2012
(Continued)

*Primary Examiner* — Suchin Parihar
(74) *Attorney, Agent, or Firm* — The Webb Law Firm (57) ABSTRACT

An inductive power transfer pad for a system for inductive power transfer to a vehicle includes a stationary part and a movable part which, in a resting position, rests on the stationary part and which is upwardly movable in a Z-direction relative to the stationary part in order to reach a higher position. The stationary part has a frame surrounding the stationary part on at least three sides, the frame having at an upper edge which is oriented towards the movable part. The upper edge has at least one first supporting surface on which the movable part rests when it is in the resting position, wherein the at least one supporting surface on the upper edge is an inclined surface. The movable part includes at least one first contacting surface which contacts the at least one first supporting surface when the movable part is in the resting position, with the first contacting surface fitting to the first supporting surface.

8 Claims, 6 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2013/0154553 A1* | 6/2013 | Steele | B60M 7/003 |
| | | | 320/108 |
| 2013/0249470 A1* | 9/2013 | Martin | B60L 53/12 |
| | | | 320/107 |
| 2017/0080815 A1 | 3/2017 | Wechsler et al. | |
| 2017/0129345 A1* | 5/2017 | Wechsler | B60K 1/04 |
| 2017/0136892 A1* | 5/2017 | Ricci | B60L 53/66 |
| 2017/0136896 A1* | 5/2017 | Ricci | H02J 7/025 |
| 2019/0023139 A1* | 1/2019 | Wechsler | B60L 53/39 |
| 2019/0033164 A1* | 1/2019 | Ing | B60L 50/64 |
| 2020/0164758 A1* | 5/2020 | Flechl | B60L 53/35 |
| 2021/0335535 A1* | 10/2021 | Cong | H01F 27/325 |
| 2021/0339641 A1* | 11/2021 | Wechsler | B60L 53/10 |
| 2021/0359547 A1* | 11/2021 | Wechsler | B60L 53/302 |
| 2021/0394633 A1* | 12/2021 | Curran | B60L 53/12 |

FOREIGN PATENT DOCUMENTS

| | | |
|---|---|---|
| WO | 2011106506 A2 | 9/2011 |
| WO | 2015128450 A1 | 9/2015 |
| WO | 2016184791 A1 | 11/2016 |

\* cited by examiner

INDUCTIVE POWER TRANSFER PAD

CROSS-REFERENCE TO RELATED APPLICATIONS

This application is the United States national phase of International Application No. PCT/EP2018/072242 filed Aug. 16, 2018, and claims priority to United Kingdom Patent Application No. 1713676.3 filed Aug. 25, 2017, the disclosures of which are hereby incorporated by reference in their entirety.

BACKGROUND OF THE INVENTION

Field of the Invention

The present invention relates to an inductive power transfer pad including stabilization means against external forces, particularly forces caused by a motor vehicle that drives against or onto the power transfer pad or that performs a steering onto the pad.

Description of the Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary windings or primary winding structure) and can be fed by a wayside power converter (WPC). The second set of windings (secondary winding structure) is installed on the vehicle. For example, the second set of windings can be attached underneath the vehicle, in the case of trams under some of its wagons. For an automobile it can be attached to the vehicle chassis. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

For inductive power transfer, inductive power transfer pads comprising a stationary part and a movable part are known from the state of the art. WO 2015128450 A1 discloses an inductive power transfer pad comprising a stationary part and a movable part, wherein the movable part comprises a primary winding structure, wherein the movable part is movable between a retracted state and an extended state.

When a motor vehicle drives against or onto the power transfer pad, which could happen before, during or after the power transfer, the power transfer pad is prone to damage by forces caused by the move or the weight of the motor vehicle.

SUMMARY OF THE INVENTION

The objective of the present invention is to provide with a power transfer pad which provides stability against external mechanical forces which are caused by a motor vehicle.

According to a basic idea of the invention, different types of mechanical supports could be provided at the stationary and/or the movable part. The stationary part may comprise one or more inclined surfaces which can contact counter-surfaces of the movable part. The counter-surfaces can fit to the inclined surfaces With the present invention, in its broadest or in special embodiments, one or more of the following benefits could be reached:
  prevent the movable part from lateral displacement, from twisting or from tilting, when it is in its resting position on the stationary part and when external forces are applied, for example by a motor vehicle
  the resting position of the movable part can be stabilized when a car drives against or onto the movable part, when in resting position, or when a wheel in the movable part is subjected to a movement be rolling or steering,
  stabilization against forces in Z-direction
  movable parts for stabilization within the stationary or movable part can be avoided.

The invention particularly provides with an inductive power transfer pad, in particular of a system for inductive power transfer to a vehicle, comprising
  a stationary part
  a movable part, which in a resting position rests on the stationary part and which is movable in Z-direction relatively to the stationary part upwards in order to reach a higher position,
  wherein
  the stationary part comprises a frame, surrounding the stationary part at least three sides, the frame having at an upper edge which is oriented towards the movable part,
  the upper edge has at least one first supporting surface on which the movable part rests when it is in the resting position,
  the at least one first supporting-surface of the upper edge is an inclined surface
  the movable part comprises at least one first contacting surface which directly and/or indirectly rests on the at least one first supporting surface when the movable part is in the resting position, wherein the first contacting surface fits to the first supporting surface.

The terms "first", "second" etc. are intended to distinguish different types of supporting/contacting surfaces or supporting/contacting surfaces at different places from each other. It is possible, that more than one "first" ("second", "third" etc.) supporting surfaces are present.

The resting position is also called the "retracted state".

One or more inclined contacting surfaces effectively prevent the movable part from lateral displacement, from twisting or from tilting, when it is in its resting position on the stationary part. The resting position of the movable part can be stabilized when a car drives against or onto the movable part, when in resting position, or when a wheel in the movable part is subjected to a movement be rolling or steering. By one or more inclined contacting surfaces friction force between stationary part and movable part can be increased when the movable part is in its resting position.

In one embodiment, two or more first contacting surfaces are present which are inclined in different directions, when the line of sight of an observer is fixed.

In one embodiment two first inclining surfaces are present, which can be parallel to each other and which can be inclined in different directions.

From another perspective, one (or more) first contacting surface inclines from the inside of the stationary part downwards to the outside of the stationary part, or from the outside of the stationary part downwards to the inside of the stationary part.

In one embodiment, which could be beneficially combined particularly with the previously-mentioned embodiment, the frame is U shaped, having an upper edge which is also U-shaped. The three legs of the U-upper edge each comprise a first supporting-surface.

The movable part comprises a primary winding structure and is also called "winding unit".

The winding unit comprises a base and a cover. The primary winding structure is located in the base. The base preferably comprises the the at least one first contacting surface, particularly at the bottom side.

The first contacting surface can be inclined in the same manner as a first supporting surface.

The term "resting on" means that a contacting surface is supported by a supporting surface in the resting position of the movable part. A contacting surface may directly or indirectly rest on a supporting surface. So, the contacting surface may directly contact a supporting surface, or, as an alternative, indirectly contacts a supporting surface, wherein one or more further elements, such as a bellow, may be located between a contacting and a supporting surface in resting position.

In one embodiment, a damping element is be located between a contacting surface and a supporting surface, which may be the case with any of such surfaces disclosed herein. A damping element damps a noise or vibration when the movable part is brought into a resting position. In a specific embodiment the damping element is a bellow or a part of a bellow which connects the stationary part and the movable part. A bellow is folded when the movable part is brought into a resting position, and the bellow, or a part thereof may be brought in a position in between a supporting surface and a resting surface.

In one embodiment, the stationary part comprises one or more protrusions in Z-direction, each protrusion comprising a second supporting surface, and the movable part comprises at its lower side a second contacting surface which rests on the second supporting surface when the movable part is in the resting position. This embodiment provides with further stabilization of the pad against external forces in Z-direction, for example caused by a motor vehicle driving onto or standing on the pad.

In one embodiment, the movable part, particularly a previously mentioned cover of the movable part, comprises an outer edge which is a rounded edge on the upper side or which comprises an inclining part on the upper side. This embodiment is beneficial when a wheel of a car rolls onto the pad. The edge may be dimensioned in a way that it provides with a bearing face for a wheel which drives against and onto the power transfer pad.

In a further embodiment, the a movable part comprises at its bottom side a protrusion, having a first lateral surface, wherein in the resting position the first lateral surface contacts or rests on a second lateral surface which is formed at the stationary part. The protrusion at the movable part may be a housing for electronic components. This embodiment provides with further means for preventing tilting of twisting of the movable part when it is in the resting position. Said second lateral surface may be a lateral surface of a protrusion which is formed in upward direction at the stationary part.

In still another embodiment, the movable part and/or the stationary part comprise a protrusion which is placed in a recess of the counter-part, (counter part of stationary part is the movable part and vice versa) when the movable part is in the resting position. This embodiment provides with further means for preventing twisting of the movable part against the stationary part. Protrusions and recesses help to center a movable part on a stationary part when the movable part is brought to resting position.

In a further embodiment, the Inductive power transfer pad comprises an electronic housing, and a receiving section for the movable part, wherein the electronic housing comprises, on its outside, a third supporting surface which is an inclined surface, wherein a third contacting surface, which is formed at the movable part rests on the third supporting surface when the movable part is in the resting position, wherein the third contacting surface fits to the third supporting surface. Said third supporting surface may be oriented in lengthwise or cross direction of the pad. Said third supporting surface may be oriented along outer side of the housing.

BRIEF DESCRIPTION OF THE DRAWINGS

Hereinafter, the invention will be described in more detail but without limitation with reference to attached working examples and figures which show.

Figure 1:
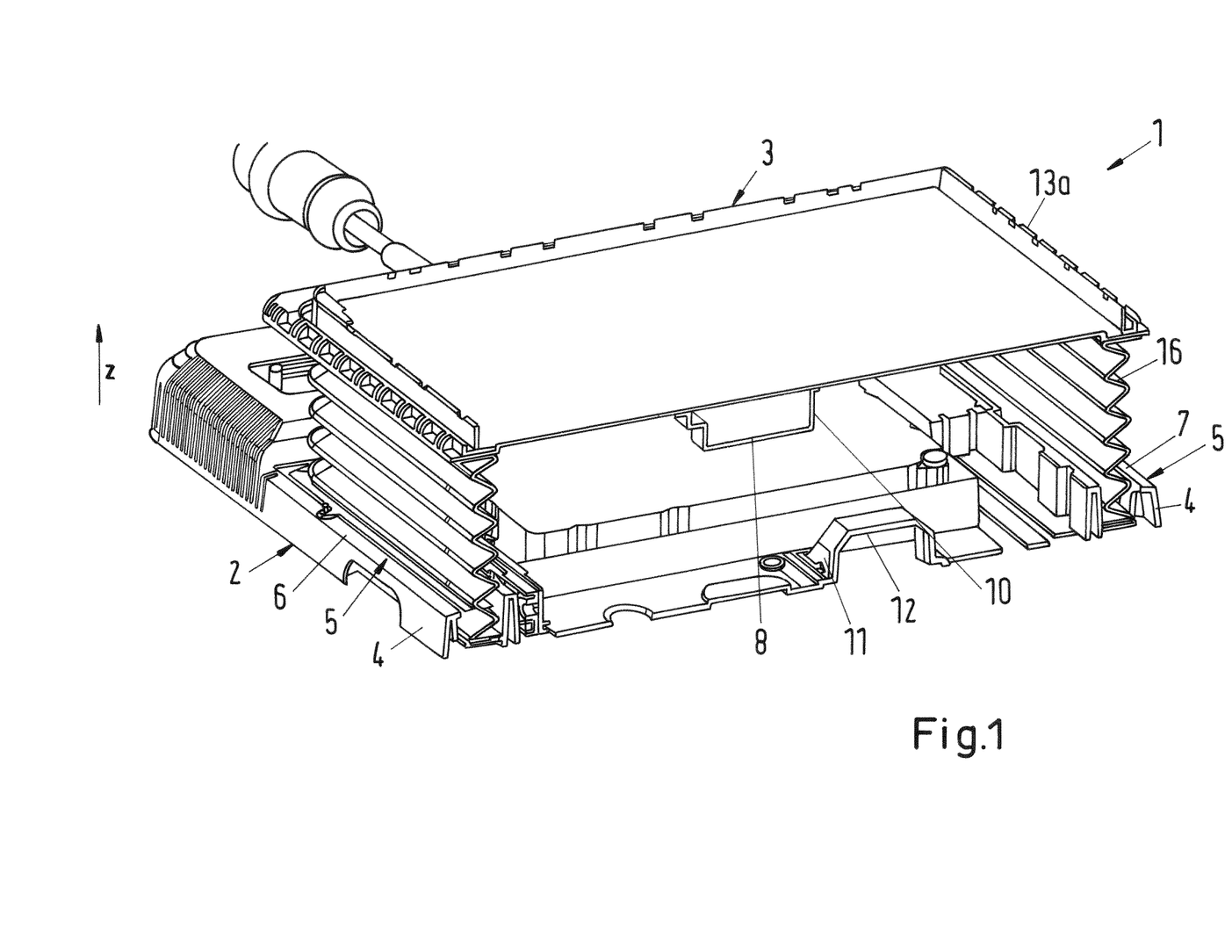
FIG. 1 a power transfer pad of the invention in a cross section in perspective view.

FIG. 1 shows a power transfer pad 1 with the stationary part 2 and the movable part 3. The movable part 3 with the base 13*a* is moved upwards in Z-direction so that it is not in its resting position. The movable part 3 comprises primary windings which are not shown in further detail.

Parts of a frame 4 of the stationary part are shown. Also shown are parts of an upper edge 5 of the frame 4, wherein the upper edge 5 is oriented towards the movable part 3. FIG. 1 shows, in part, two first supporting surfaces 6, 7 on which the movable part 3 rests when it is in the resting position.

FIG. 1 also shows a protrusion 8 at the bottom side of the movable part 3. The protrusion 8 comprises a first lateral surface 10. When the movable part 3 is in its resting position, the first lateral surface 10 contacts the second lateral surface 11 which is formed at a protrusion 12 of the stationary part 2.

Figure 2:
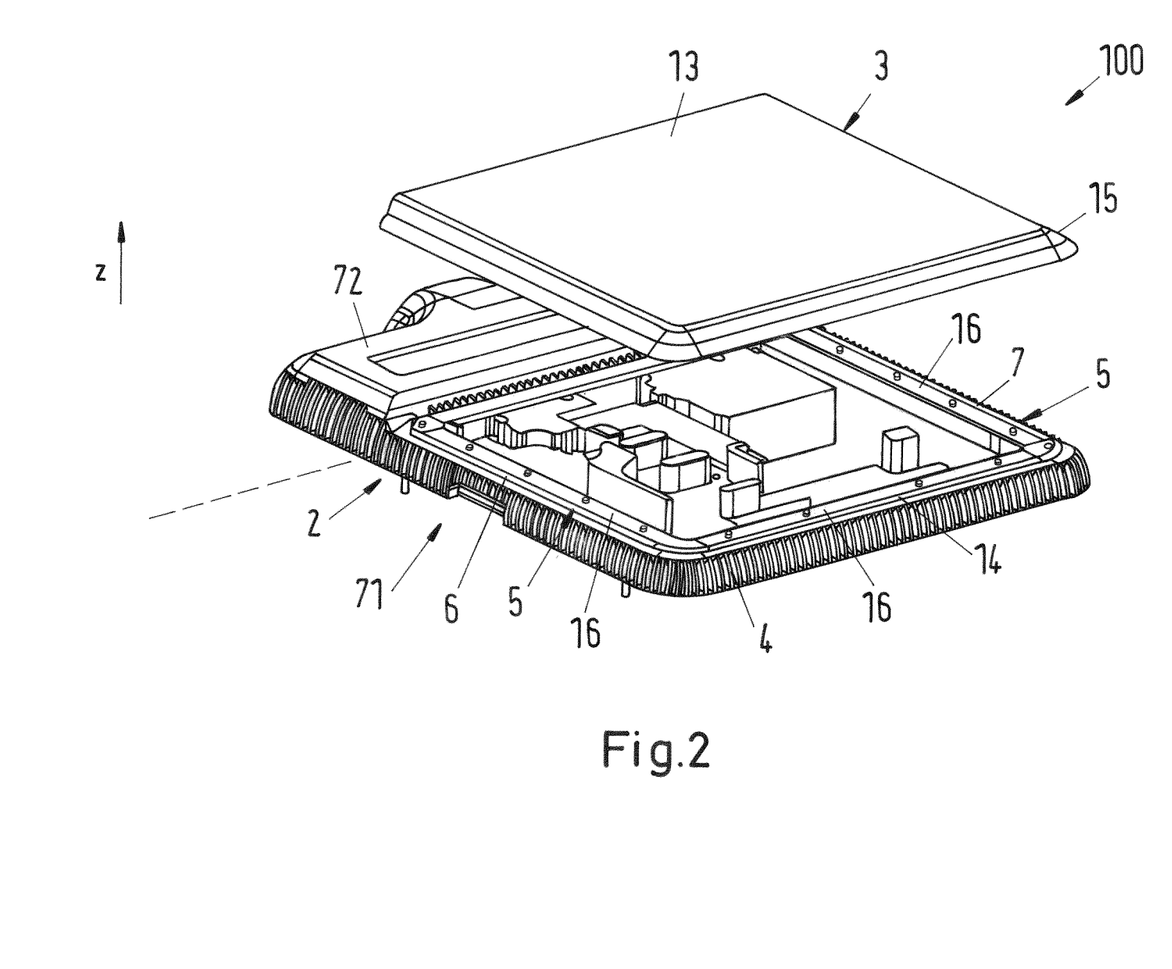
FIG. 2 a power transfer pad of the invention in perspective view from the top side.

FIG. 2 shows a pad 100, which is in its inner structure slightly different from pad 1 of FIG. 1. In FIG. 2, the movable part 3 is shown with the cover 13 which covers the base 13*a* and the inner structure of the movable part 3. In FIG. 2 a further first supporting surface 14 is shown.

FIG. 2 moreover shows an outer edge 15 of the cover 13 which is inclining. In FIG. 2, the movable part 3 is also shifted upwards in Z-direction.

In FIG. 2, a bellow 16 (FIG. 1), which connects the movable part 3 with the stationary part 2, is shown in a folded manner (as it would be when the movable 3 part rests on the stationary part 2), partially covering the first supporting surfaces 6, 7 and 14.

As will be shown in FIG. 6 below, a part of the bellow 16 is located between each first supporting surface 6, 7 and 14 and the respective first contacting surface, serving as a damping element, when the movable 3 part rests on the stationary part 2.

FIG. 2 also shows an electronic housing 72 and a receiving section 71, which are separated from each other by a virtual dashed line.

Figure 3:
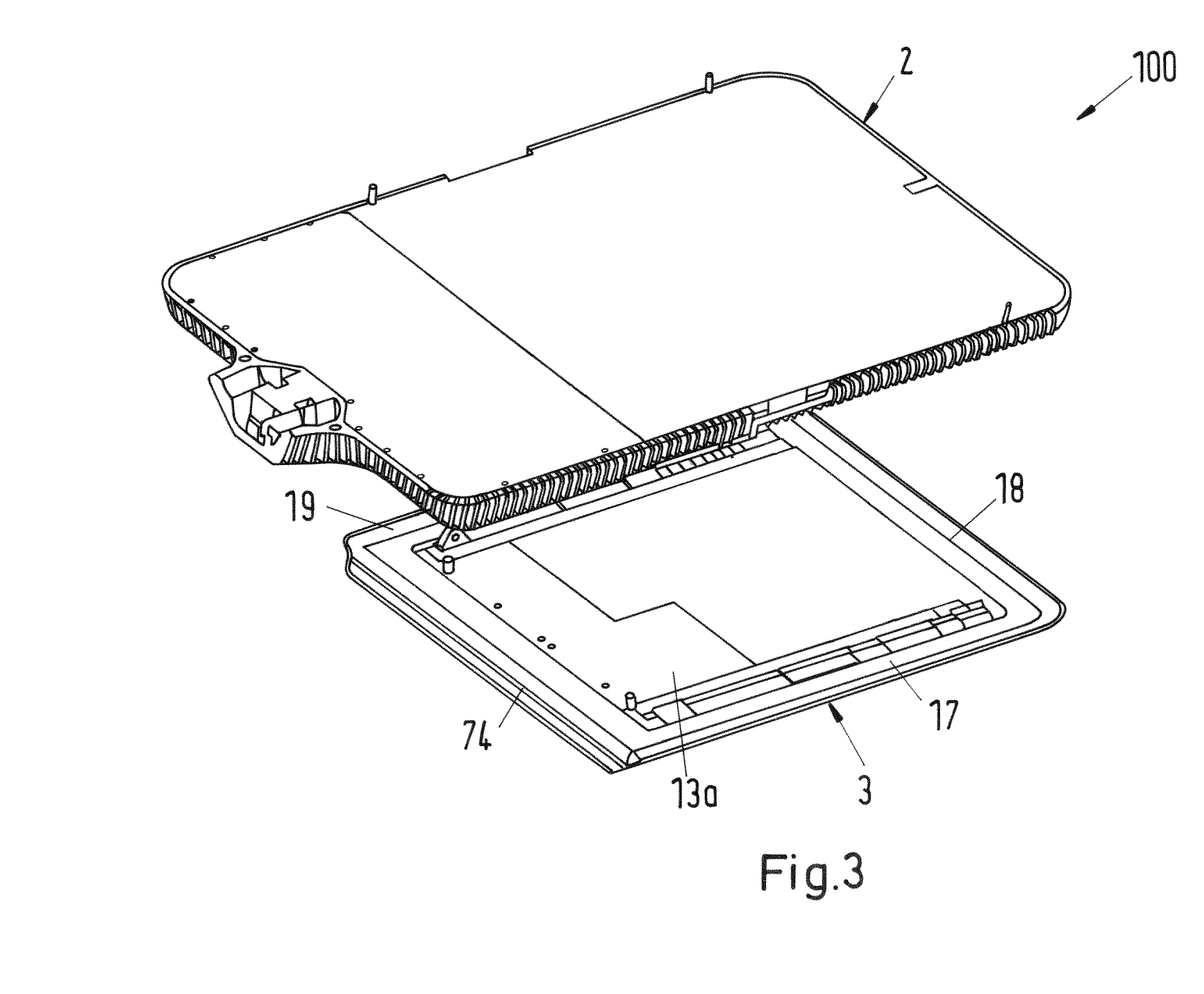
FIG. 3 a power transfer pad of the invention in perspective view from the bottom side.

FIG. 3 shows a view on the bottom side of a stationary part 2 and a movable part 3. First contacting surfaces 17, 18, 19 on the bottom side of the movable part 3 are shown. These contacting surfaces 17, 18, 19 rest on the inclining first supporting surfaces 6, 7, 14 when the movable part 3 is in its resting position.

Figure 4:
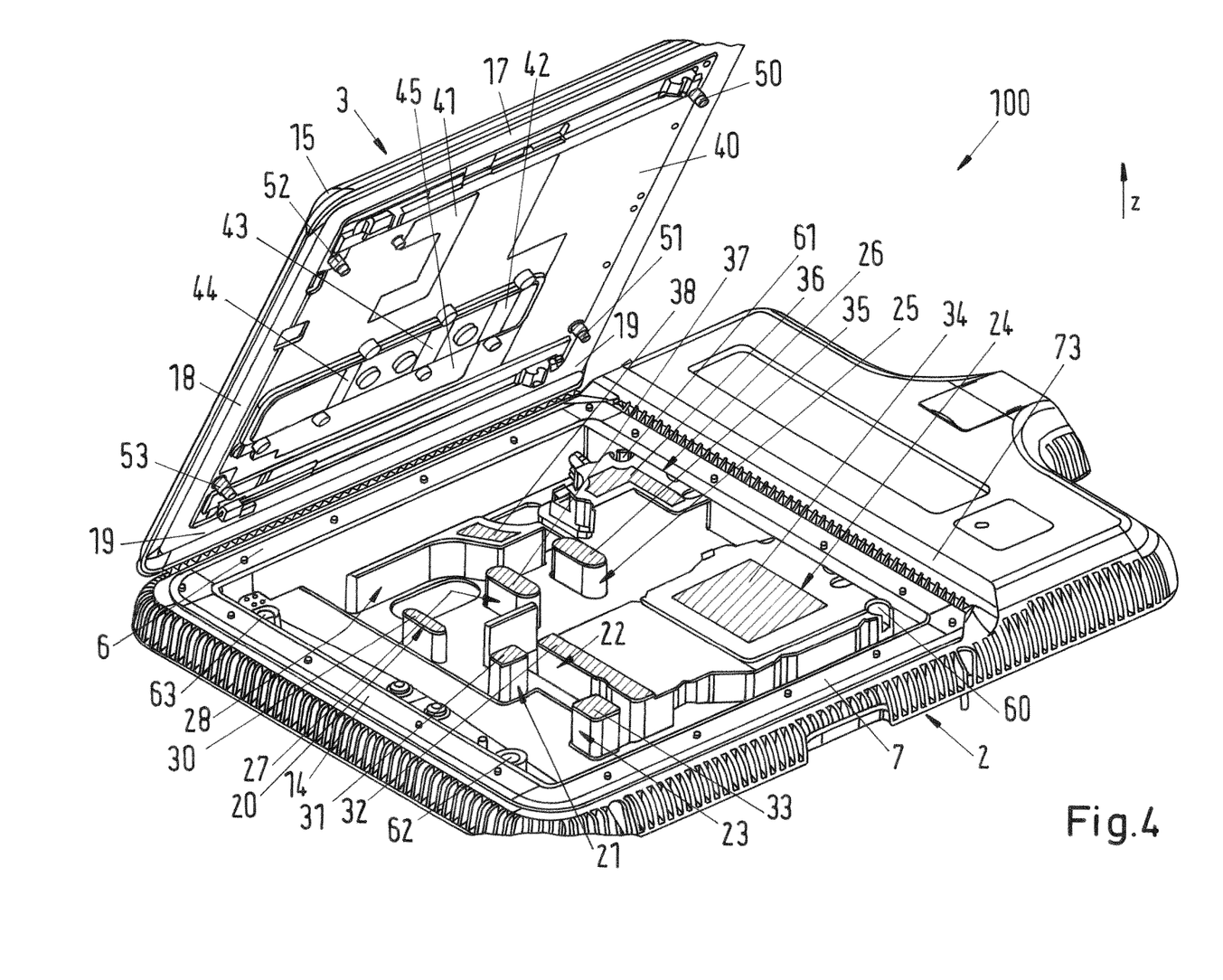
FIG. 4 a power transfer pad of the invention in perspective view from the top side.

FIG. 4 shows the same pad as FIG. 2. The movable part 3 is opened in a way how it is not opened in reality. In reality, the movable part 3 is shifted in Z-direction, whereas in the view of FIG. 4 it is shown tilted, but just for the purpose of showing features.

FIG. 4 shows protrusions 20, 21, 22, 23, 24, 25, 26, 27, 28 in Z-direction, each protrusion comprising a second supporting surface 30, 31, 32, 33, 34, 35, 36, 37, 38. The movable part 3 comprises second contacting surfaces 40, 41, 42, 42, 44, 45. The number of the second contacting surfaces is smaller than the number of second supporting surfaces because some second contacting surfaces contact or rest on more than one second supporting surface 30-38. For example, second contacting surface 40 contacts second supporting surfaces 34 and 36.

FIG. 4 moreover shows protrusions 50, 51, 52, 53 which are formed on the bottom side of the movable part 3 and which are pins. At the stationary part 2, recesses 60, 61, 62, 63 are formed. When in resting position, the protrusions 50, 51, 52, 53 are placed in the recesses 60, 61, 62, 63, for example protrusion 50 in the recess 60.

Figure 5:
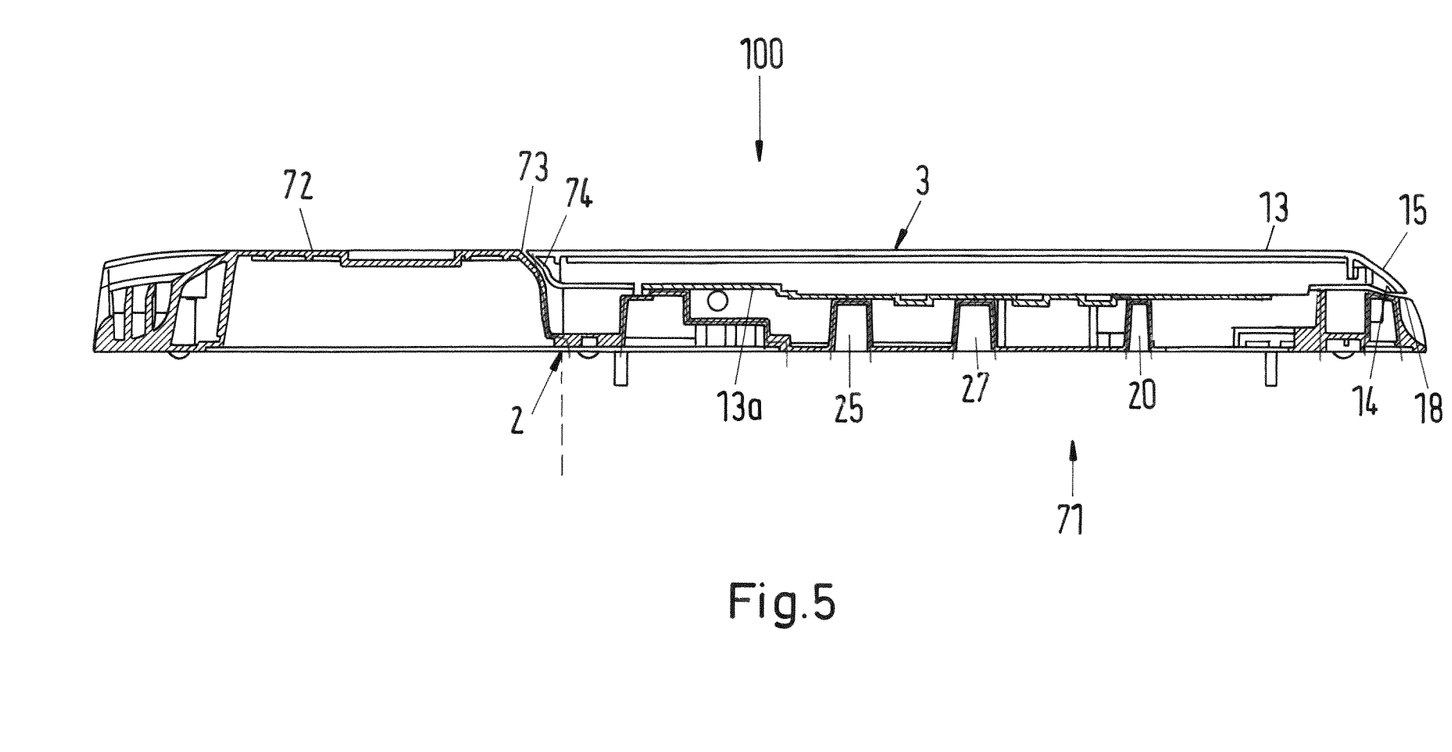
FIG. 5 a power transfer pad of the invention in a cross section.

FIG. 5 shows the movable part 3 in its resting position. FIG. 5 is a cross-section through the pad 100 of FIG. 2-4.

FIG. 5 shows a third supporting surface 73, which is also shown in FIG. 4. The third contacting surface 74 in the resting position rests on the third supporting surface 73. Both surfaces 73, 74 are inclined surfaces.

Figure 6:
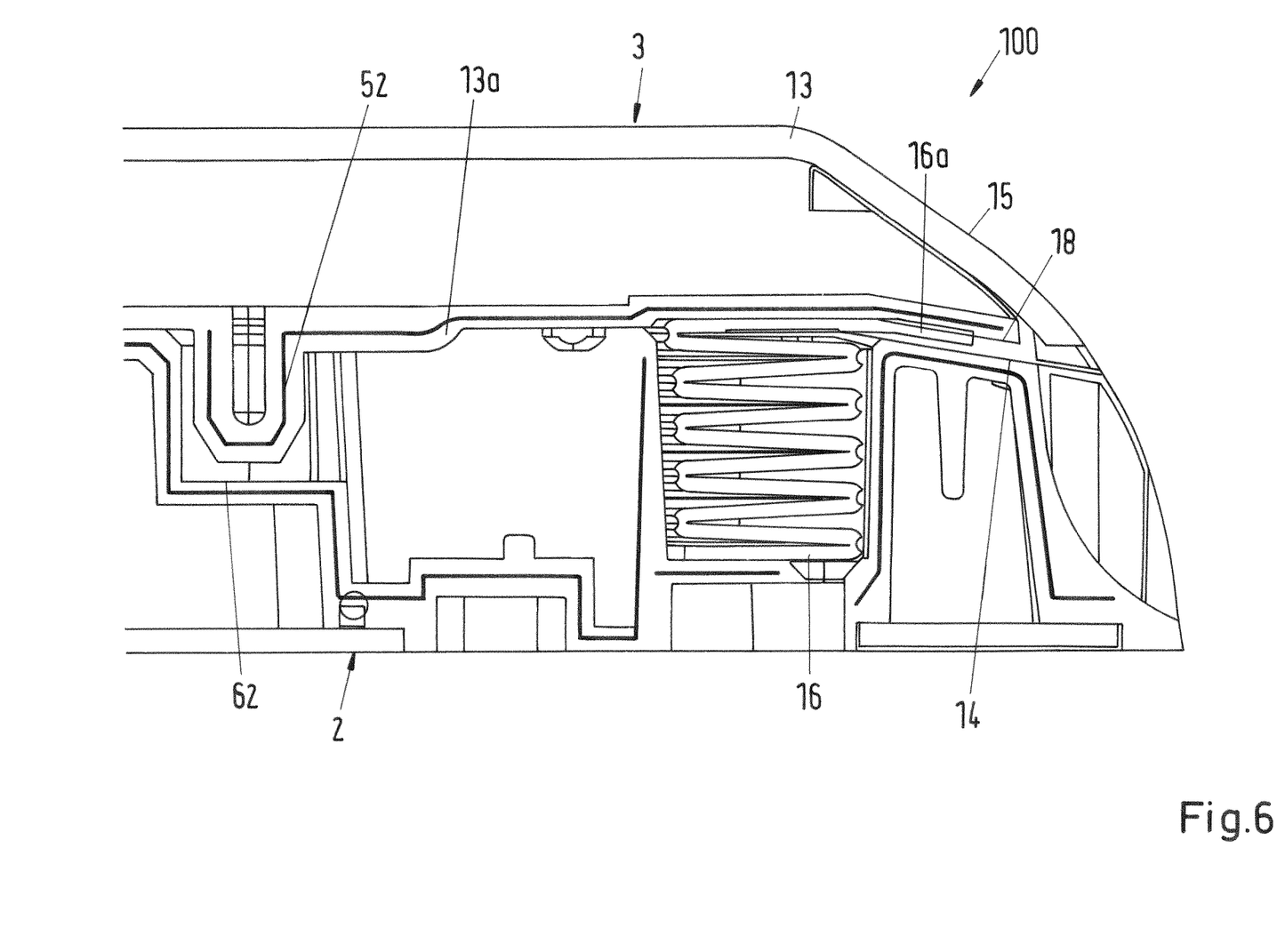
FIG. 6 a detail of a power transfer pad of the invention in a cross section.

FIG. 6 shows a detailed view, in a cross-section through a front part of a pad 100 in the resting position of the movable part 3. FIG. 6 shows how the first supporting surface 14, which is an inclined surface, and a first contacting surface 18 fit each other in the resting position. FIG. 6 shows that a part 16a of the bellow 16 is located between the first supporting surface 14 and the first contacting surface 18. The part 16a, or section of the bellow serves as a damping element.

Moreover, FIG. 6 shows how the protrusion 52, which is a pin, is sitting in the recess 62 then the movable part 3 is in a resting position.

The invention claimed is:

1. An inductive power transfer pad for a system for inductive power transfer to a vehicle, the inductive power transfer pad comprising:
a stationary part; and
a movable part which, in a resting position, rests on the stationary part and which is upwardly movable in a Z-direction relative to the stationary part in order to reach a higher position,
wherein:
the stationary part comprises a frame surrounding the stationary part on at least three sides, the frame having at an upper edge which is oriented towards the movable part,
the upper edge has at least one first supporting surface on which the movable part rests when it is in the resting position,
the at least one first supporting surface on the upper edge is an inclined surface,
the movable part comprises at least one first contacting surface which directly and/or indirectly rests on the at least one first supporting surface when the movable part is in the resting position,
the first contacting surface fits to the first supporting surface, and
wherein the first contacting surface directly contacts the first supporting surface in the resting position or wherein one or more further elements are located between the first contacting surface and the first supporting surface in the resting position.

2. The inductive power transfer pad according to claim 1, wherein two or more first contacting surfaces are present which are inclined in different directions.

3. The inductive power transfer pad according to claim 1, wherein the movable part comprises a base, wherein the base comprises the first contacting surface.

4. The inductive power transfer pad according to claim 1, wherein the stationary part comprises one or more protrusions in the Z-direction, each of the one or more protrusions comprising a second supporting surface, and
wherein the movable part comprises at its bottom side a second contacting surface which rests on the second supporting surface when the movable part is in the resting position.

5. The inductive power transfer pad according to claim 1, wherein the movable part comprises an outer edge on an upper side which is a rounded edge or which comprises an inclining part.

6. The inductive power transfer pad according to claim 1, wherein the movable part comprises at its bottom side a protrusion having a first lateral surface, wherein, in the resting position, the first lateral surface rests on a second lateral surface which is formed at the stationary part.

7. The inductive power transfer pad according to claim 1, wherein one of the movable part and the stationary part comprises a protrusion which is placed in a recess of the stationary part or of the movable part when the movable part is in the resting position.

8. The inductive power transfer pad according to claim 1, further comprising an electronic housing, and a receiving section for the movable part, wherein the electronic housing comprises, on its outside, a third supporting surface which is an inclined surface, wherein a third contacting surface, which is formed at the movable part, rests on the third supporting surface when the movable part is in the resting position, and wherein the third contacting surface fits to the third supporting surface.

* * * * *